(12) United States Patent
Kubo (10) Patent No.: US 8,518,519 B2
(45) Date of Patent: Aug. 27, 2013

(54) RESIN MOLDED COMPONENT FOR VEHICLE AND MANUFACTURING METHOD THEREOF

(75) Inventor: Ryuji Kubo, Kawasaki (JP)

(73) Assignee: FALTEC Co., Ltd., Kawasaki-shi (JP)

( * ) Notice: Subject to any disclaimer, the term of this patent is extended or adjusted under 35 U.S.C. 154(b) by 401 days.

(21) Appl. No.: 12/846,637

(22) Filed: Jul. 29, 2010

(65) Prior Publication Data

US 2011/0025085 A1 Feb. 3, 2011

(30) Foreign Application Priority Data

Jul. 30, 2009 (JP) ................. 2009-177286

(51) Int. Cl.
*B32B 3/04* (2006.01)
*B62D 25/00* (2006.01)
*B60R 13/00* (2006.01)

(52) U.S. Cl.
USPC ............... 428/121; 428/31; 428/53; 428/156; 296/1.08; 296/72; 296/73

(58) Field of Classification Search
USPC .............. 428/33, 53, 121, 156, 31; 296/1.07, 296/1.08, 72, 73
See application file for complete search history.

(56) References Cited

U.S. PATENT DOCUMENTS
2007/0181336 A1* 8/2007 Lipp et al. .................... 174/135

FOREIGN PATENT DOCUMENTS
JP   2008-279935 A   11/2008
JP   2009-001278 A    1/2009

\* cited by examiner

*Primary Examiner* — Donald J Loney
(74) *Attorney, Agent, or Firm* — Marvin A. Motsenbocker; Mots Law, PLLC (57) ABSTRACT

A sill cover includes an elongated sill cover main body, a plurality of hinges, a plurality of attachments and a linking portion. The plurality of hinges is foldably provided along a longitudinal direction of the sill cover main body. The plurality of attachments is connected to the plurality of hinges and shifts to a vehicle mounting position according to folding of the plurality of hinges. The linking portion links three attachments among the plurality of attachments to one another.

6 Claims, 11 Drawing Sheets

RESIN MOLDED COMPONENT FOR VEHICLE AND MANUFACTURING METHOD THEREOF

CROSS REFERENCE TO RELATED APPLICATION

This application claims benefit of priority under 35 U.S.C. §119 to Japanese Patent Application No. 2009-177286, filed on Jul. 30, 2009, the entire contents of which are incorporated by reference herein.

BACKGROUND OF THE INVENTION

1. Field of the Invention

The present invention relates to a resin molded component for a vehicle to be mounted on the vehicle as an exterior part of the vehicle, and a manufacturing method thereof.

2. Description of the Related Art

For example, a sill cover, which is an elongated resin molded component for a vehicle, is mounted on a bottom side of a vehicle door to protect a vehicle body. A conventional sill cover includes a sill cover main body and an attachment connected to a bottom end of the sill cover main body via a hinge. The sill cover main body and the attachment are integrally formed by injection molding.

The sill cover is mounted on a vehicle by causing the attachment to shift from an injection molding position to a vehicle mounting position with respect to the sill cover main body according to folding of the hinge. Thus, the sill cover main body and the attachment are integrally injection-molded, which reduces the number of components, a man-hour cost of assembly and the like.

If an elongated hinge and an elongated attachment are provided to an elongated sill cover main body in a longitudinal direction of the sill cover main body, the hinge has large banding rigidity, which makes folding of the attachment along a center region (rotation axis) of the hinge difficult. Thereby, there are possibilities that (1) a sill cover is not completely fixed to a vehicle, (2) a portion other than the hinge is bent, which causes the attachment to shift from an injection molding position to a displaced vehicle mounting position with respect to the sill cover main body according to folding of the hinge, and (3) the sill cover is deformed. In order to solve the above problem, Patent Document 1 (Japanese Published Unexamined Application No. 2009-1278) presents a proposal that each of the hinge and the attachment is divided into several parts and the several parts are intermediately arranged with respect to the sill cover main body.

This configuration allows the several parts of the hinge to be easily folded because banding rigidity of each part is small.

However, there are possibilities that folding man-hour increases and folded positions of the several parts deviate because the several parts of attachment need to be individually folded.

SUMMARY OF THE INVENTION

The present invention is invented in order to solve the above-described problem, and has an object to provide a resin molded component for a vehicle that allows several parts of an attachment of the resin molded component to be easily folded, without increasing folding man-hour and deviating folded positions of the several parts of attachment, and a manufacturing method thereof.

In order to achieve the above object, the present invention provides a resin molded component for a vehicle comprising: an elongated molded component main body; a plurality of hinges that is foldably provided along a longitudinal direction of the molded component main body; a plurality of attachments that is connected to the plurality of hinges and shifts to a vehicle mounting position according to folding of the plurality of hinges; and a linking portion that links at least two attachments to each other.

According to the present invention, at least the two attachments linked by the lining portion can be easily folded because a total width dimension of the hinges is shorter than one of a single hinge in a case of providing a single attachment instead of at least the two attachments, which reduces bending rigidity of the hinges. Also, folding man-hour does not increase and folded positions do not deviate because at least the two attachments linked by the linking portion are folded in an integrated manner. Therefore, the resin molded component allows at least the two attachments to be easily folded, without increasing folding man-hour and deviating folded positions of at least the two attachments.

In a preferred embodiment of the present invention, the linking portion constitutes a part of the molded component main body in the vehicle mounting position.

According to this embodiment, after the plurality of attachments is folded, the linking portion protects a vehicle body together with the sill cover main body and allows rigidity of the sill cover main body to increase.

In a preferred embodiment of the present invention, the linking portion is provided with an engagement portion to be engaged to the molded component main body in the vehicle mounting position.

According to this embodiment, at least the two attachments are held in the vehicle mounting position against elastic restoring force of corresponding hinges, which improves a vehicle mounting work.

In a preferred embodiment of the present invention, the linking portion links distal ends of at least the two attachments to each other.

According to this embodiment, when a molten synthetic resin material is injected into a cavity where the molten synthetic resin material is to be molded into the form of at least one of at least the two attachments, flow of the molten synthetic resin material is dispersed into a first route where a molten synthetic resin material flows through a cavity where the molten synthetic resin material is to be molded into the form of corresponding hinge and a second route where a resin flows through a cavity where the molten synthetic resin material is to be molded into the form of the linking portion. This increases efficiency of the flow of molten synthetic resin material, which prevents a shortage of resin from occurring.

In a preferred embodiment of the present invention, the linking portion is provided with a rib portion along a linking direction thereof.

According to this embodiment, this configuration increases the strength of linking portion, which improves the integrity of at least the two attachments linked to each other by the linking portion and improves a folding work. Further, since the cavity where the molten synthetic resin material is to be molded into the form of the linking portion is relatively thick at positions where the rib portion is to be formed, the efficiency of the flow of molten synthetic resin material increases, which prevents a shortage of resin from occurring.

In a preferred embodiment of the present invention, the plurality of attachments is provided with engagement portions to be engaged to the molded component main body in the vehicle mounting position.

According to this embodiment, the plurality of attachments is held in the vehicle mounting position against elastic restoring force of the plurality of hinges, which improves a vehicle mounting work.

In order to achieve the above object, the present invention provides a manufacturing method of a resin molded component for a vehicle including: an elongated molded component main body; a plurality of hinges that is foldably provided along a longitudinal direction of the molded component main body; a plurality of attachments that is connected to the plurality of hinges and shifts to a vehicle mounting position according to folding of the plurality of hinges; and a linking portion that links at least two attachments to each other, the manufacturing method comprising: forming a gate on a cavity to mold at least one of the attachments, wherein the attachments are at least the two attachments linked to each other by the linking portion; and injecting a molten synthetic resin material to the cavity first through the gate.

According to the present invention, a moderate amount of molten synthetic resin material robustly flows from the cavity, where the molten synthetic resin material is to be molded into the form of at least one of at least the two attachments and where the gate is formed, into the other cavity where the molten synthetic resin material is to be molded into the form of the other of at least the two attachments, via a cavity where the molten synthetic resin material is to be molded into the form of the linking portion, which prevents a shortage of resin from occurring. Further, it is possible to assume that a plurality of gates is formed on the cavities where the molten synthetic resin material is to be molded into the form of at least the two attachments linked to each other by the linking portion. This reduces load (deflection and divergence) for a mold due to a filling distance from the gate and a filling pressure per one point, which prevents burr due to pressure concentration from occurring. Furthermore, since a trace of the gate remains on at least one of the attachments, wherein the attachments are at least the two attachments linked to each other by the linking portion, which is rarely unnoticed in the vehicle mounting state, quality of the resin molded component increases.

DESCRIPTION OF THE EMBODIMENTS

An exemplary embodiment of the present invention will be described below, with reference to FIGS. 1 to 12.

Figure 1:
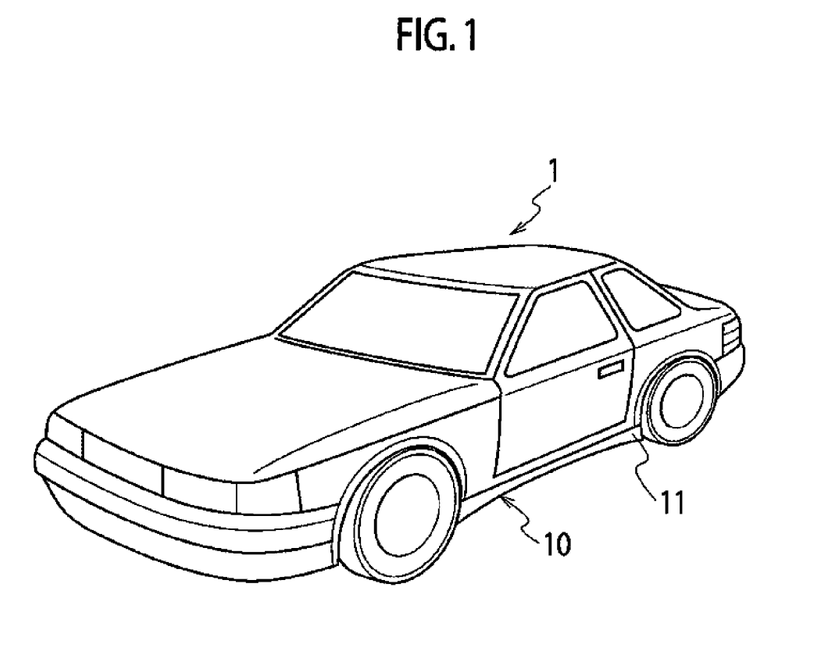
FIG. 1 is a schematic perspective view of a vehicle according to an exemplary embodiment of the present invention.
Figure 2:
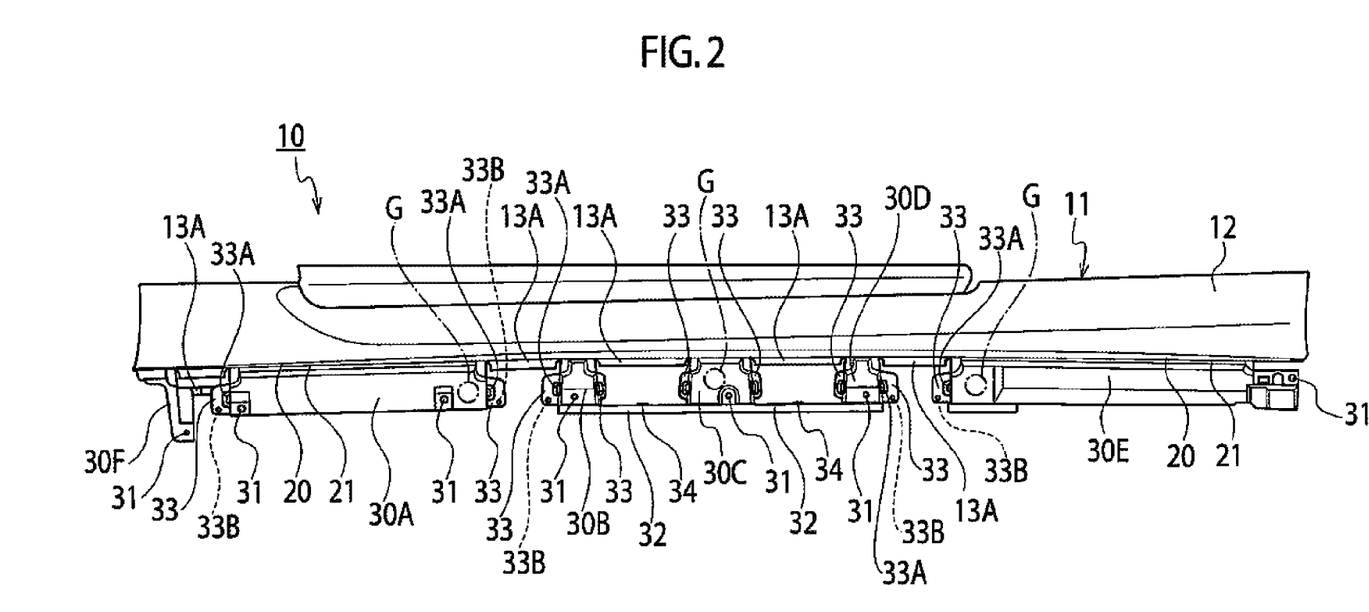
FIG. 2 is a side view of a sill cover where attachments are in injection molding positions according to the exemplary embodiment of the present invention.
Figure 3:
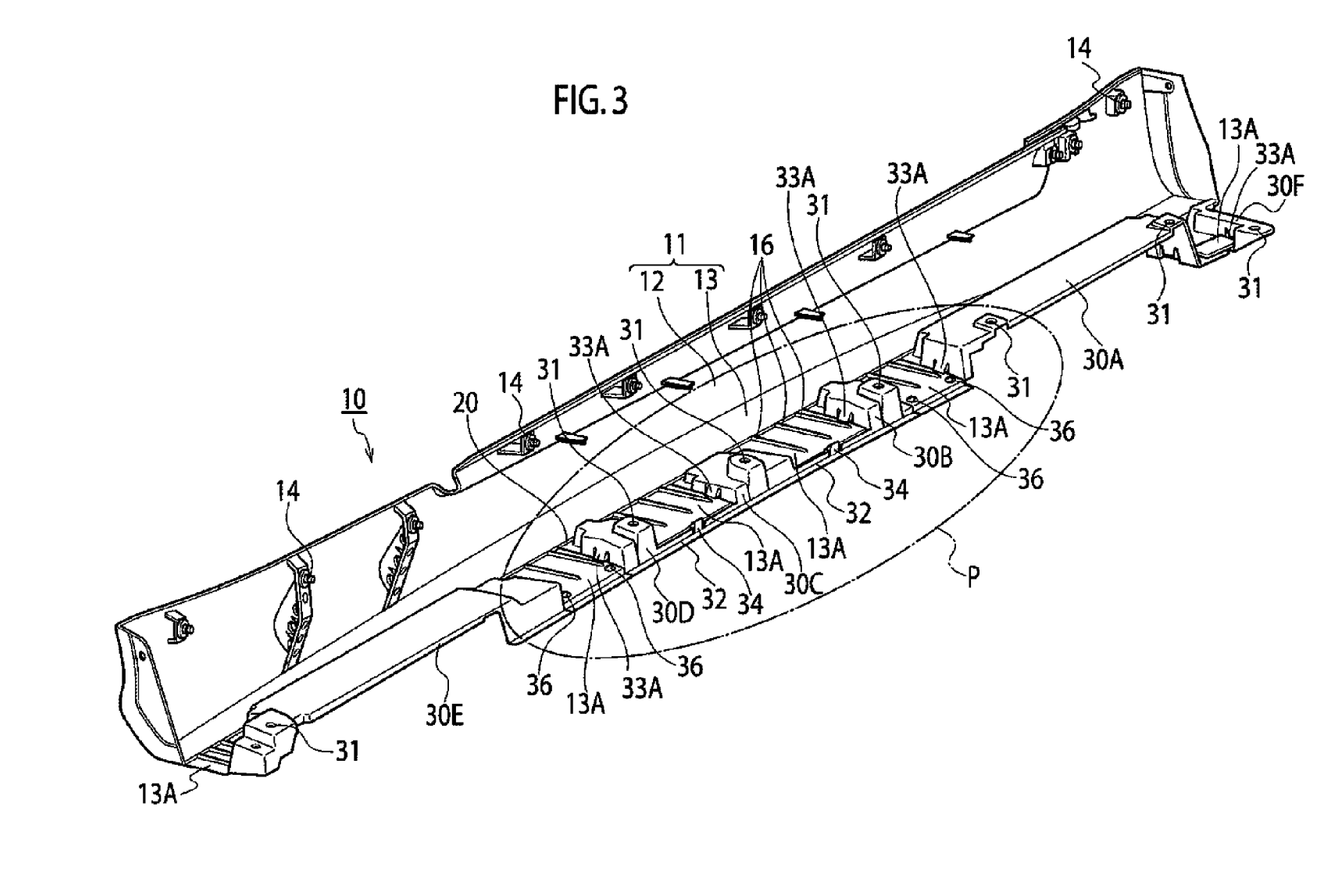
FIG. 3 is a perspective view of the sill cover viewed from an inner surface side thereof where the attachments are in vehicle mounting positions according to the exemplary embodiment of the present invention.
Figure 4:
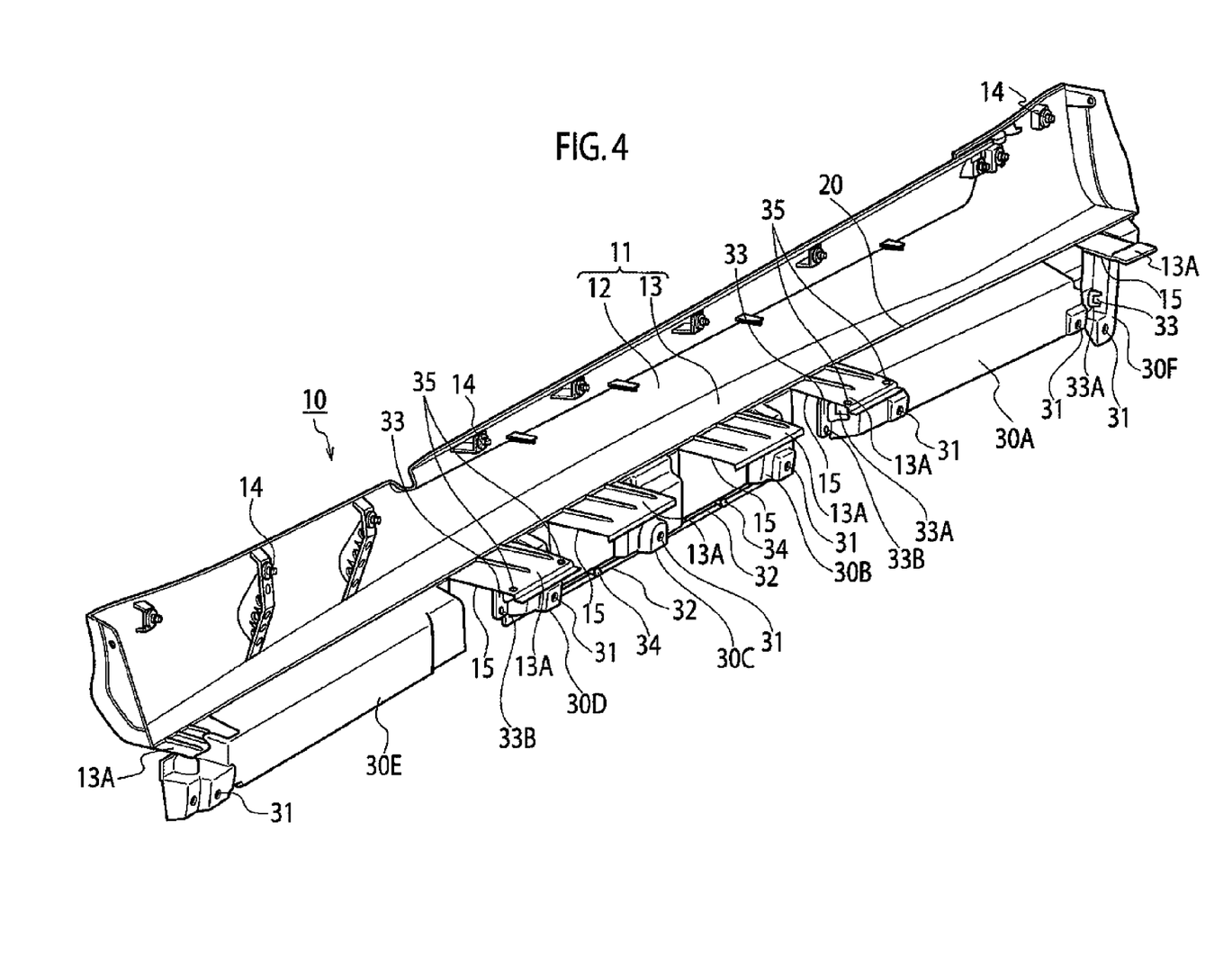
FIG. 4 is a perspective view of the sill cover viewed from the inner surface side thereof where the attachments are in the injection molding positions according to the exemplary embodiment of the present invention.
Figure 5:
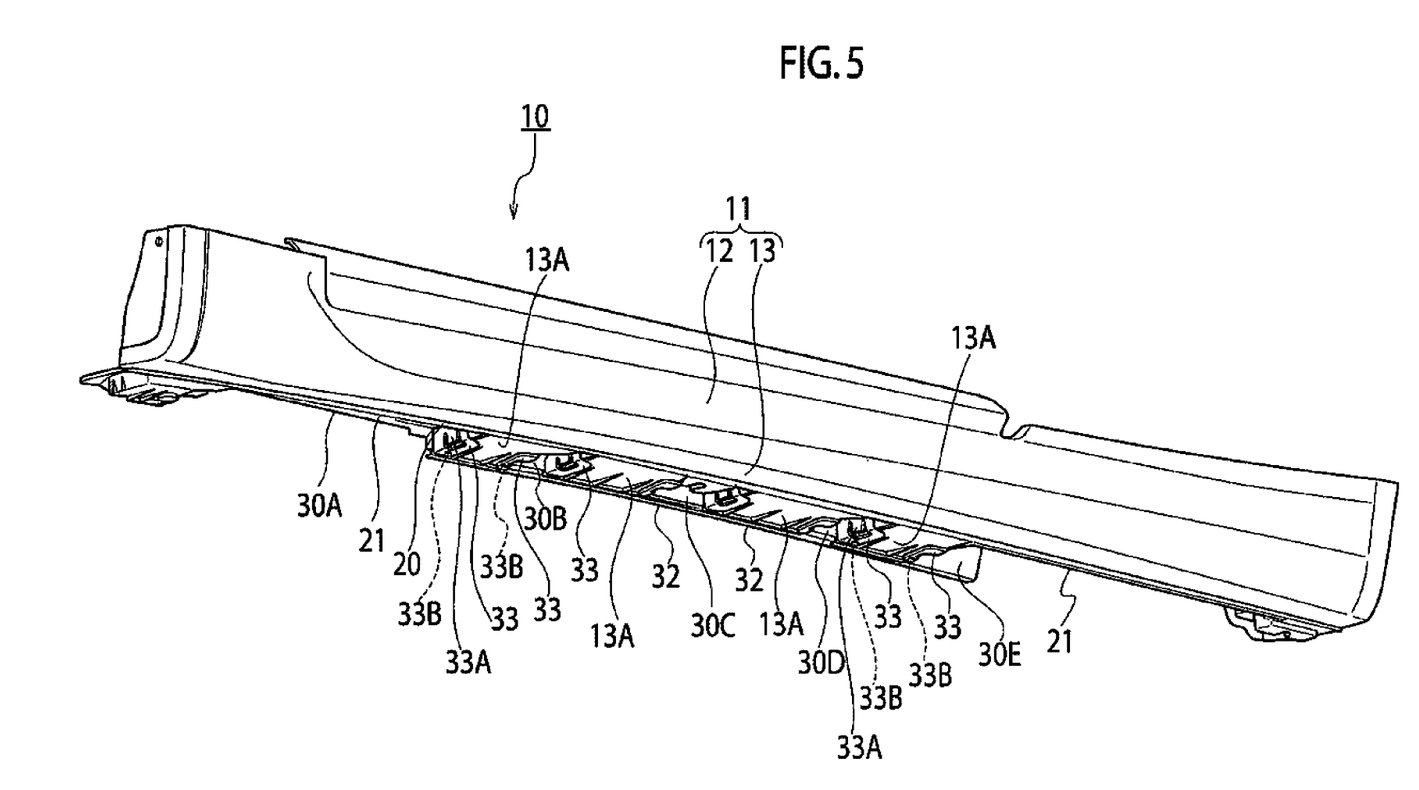
FIG. 5 is a perspective view of the sill cover viewed from an outer surface side thereof where the attachments are in the vehicle mounting positions according to the exemplary embodiment of the present invention.
Figure 6:
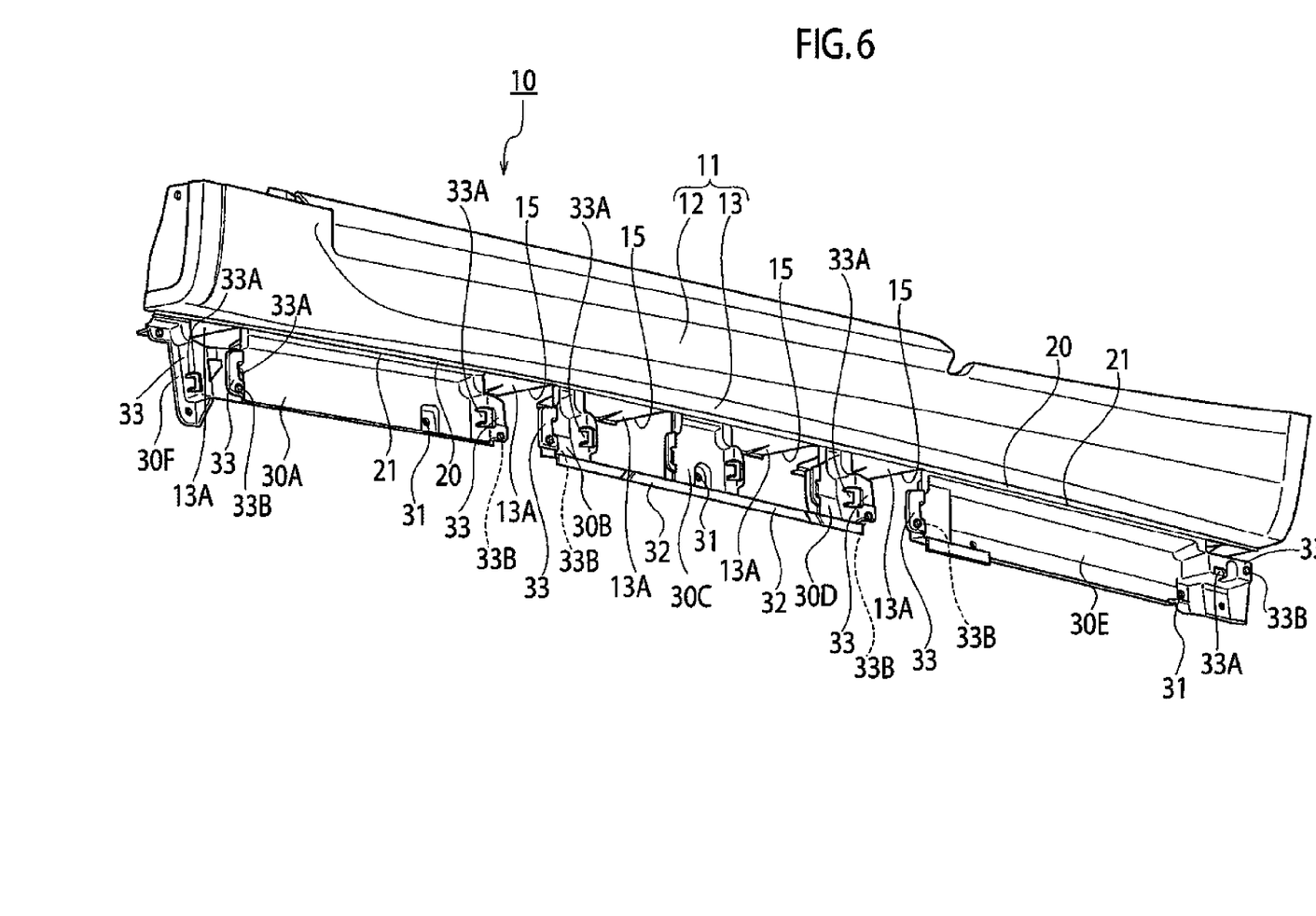
FIG. 6 is a perspective view of the sill cover viewed from the outer surface side thereof where the attachments are in the injection molding positions according to the exemplary embodiment of the present invention.
Figure 7:
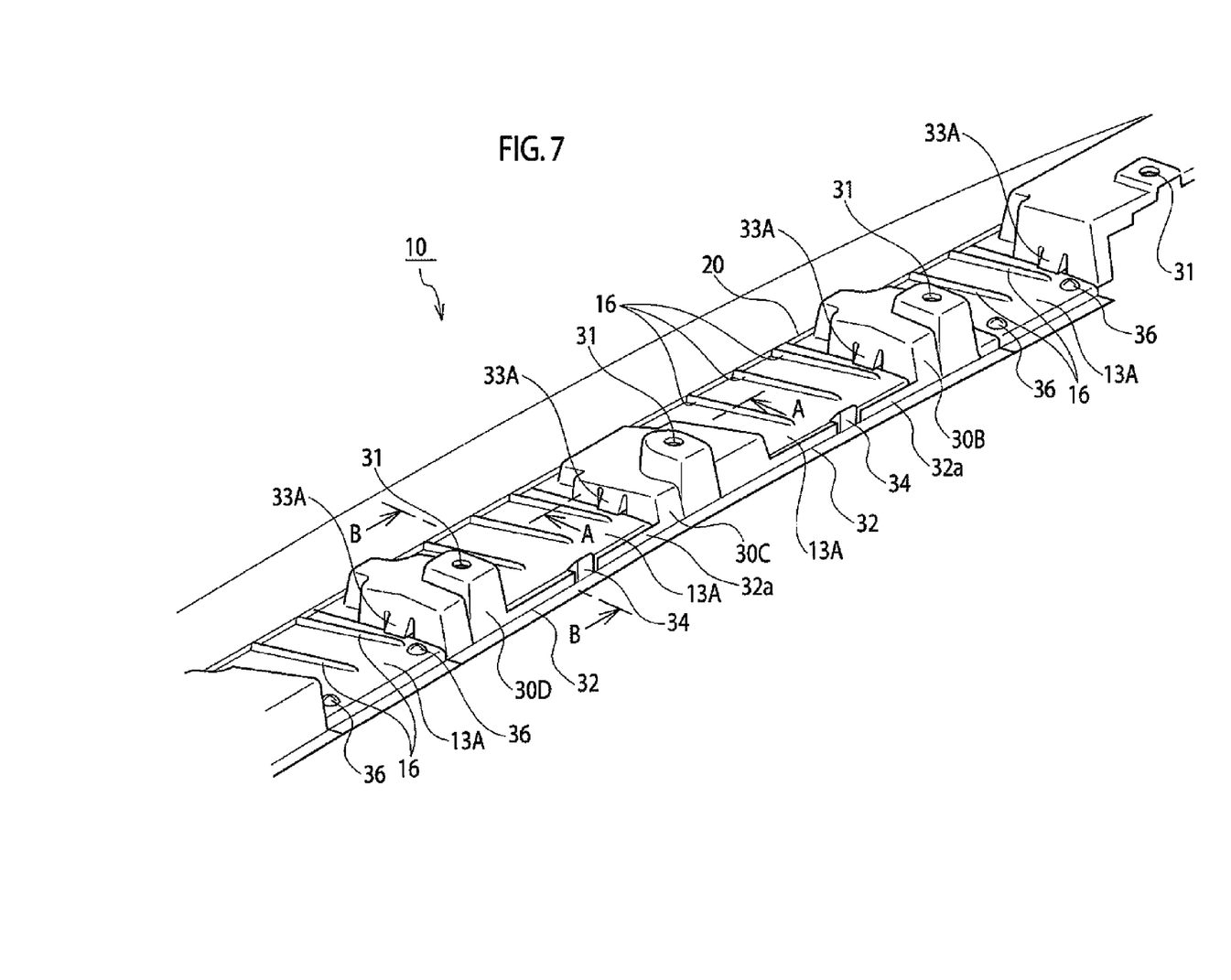
FIG. 7 is an enlarged view of a "P" area shown in FIG. 3.
Figure 8:
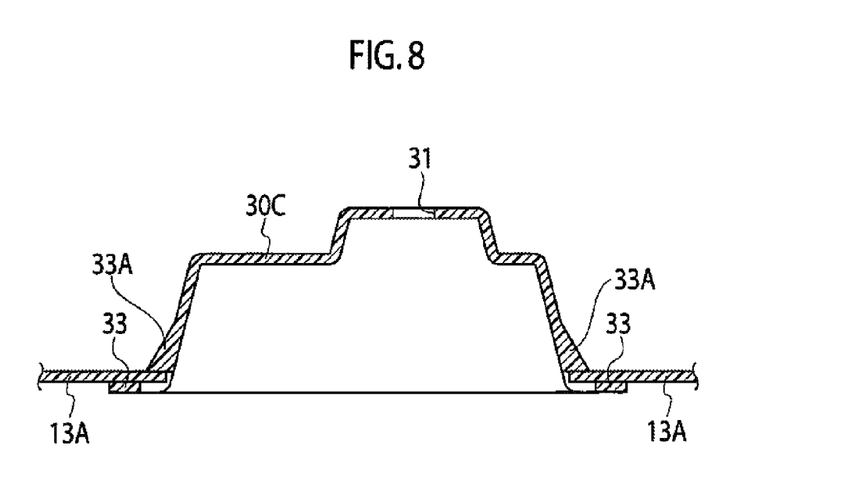
FIG. 8 is a cross-sectional view due to a line A-A shown in FIG. 7.
Figure 9:
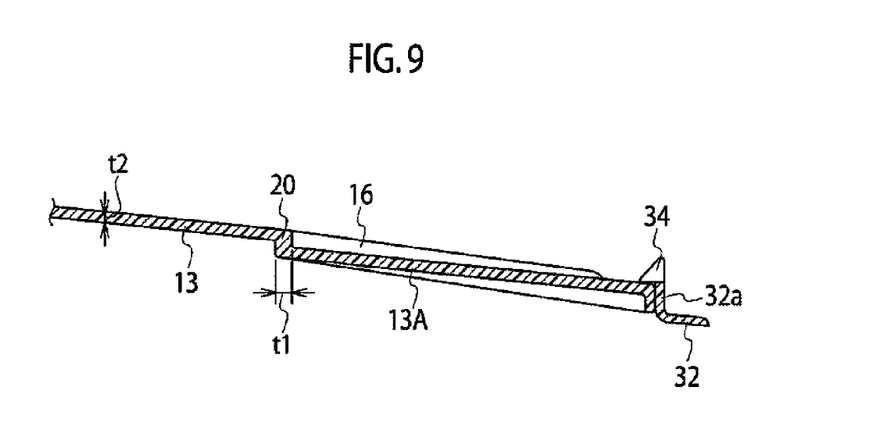
FIG. 9 is a cross-sectional view due to a line B-B shown in FIG. 7.
Figure 10A:
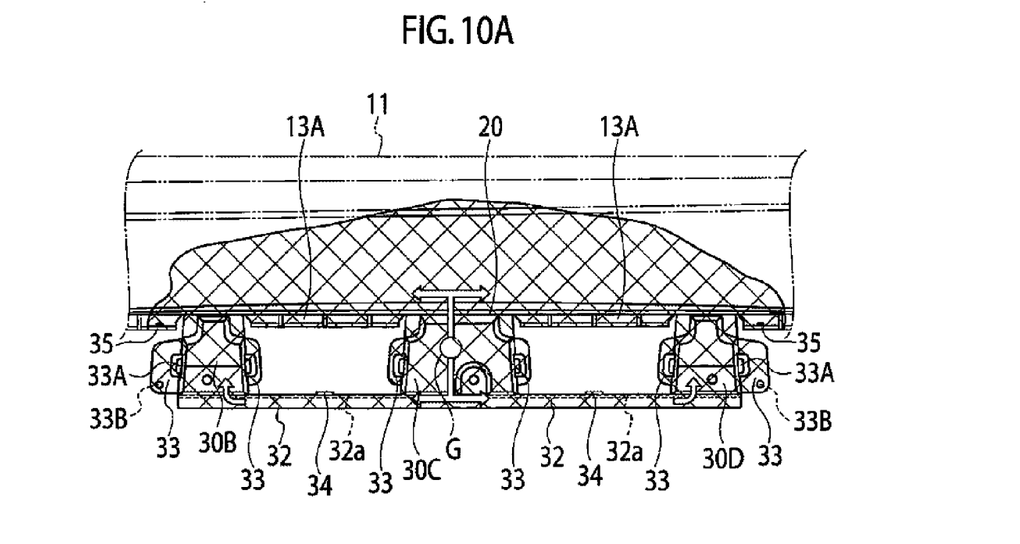
FIG. 10A is an explanatory drawing that illustrates a flow of molten synthetic resin material at a time of injection molding according to the exemplary embodiment of the present invention.
Figure 10B:
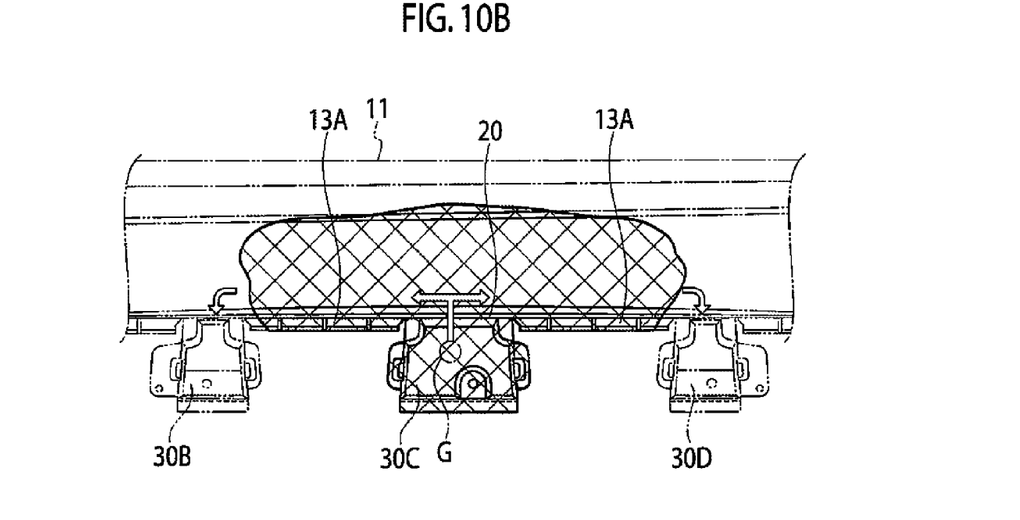
FIG. 10B is an explanatory drawing that illustrates a flow of molten synthetic resin material at a time of injection molding according to a comparative example.
Figure 11:
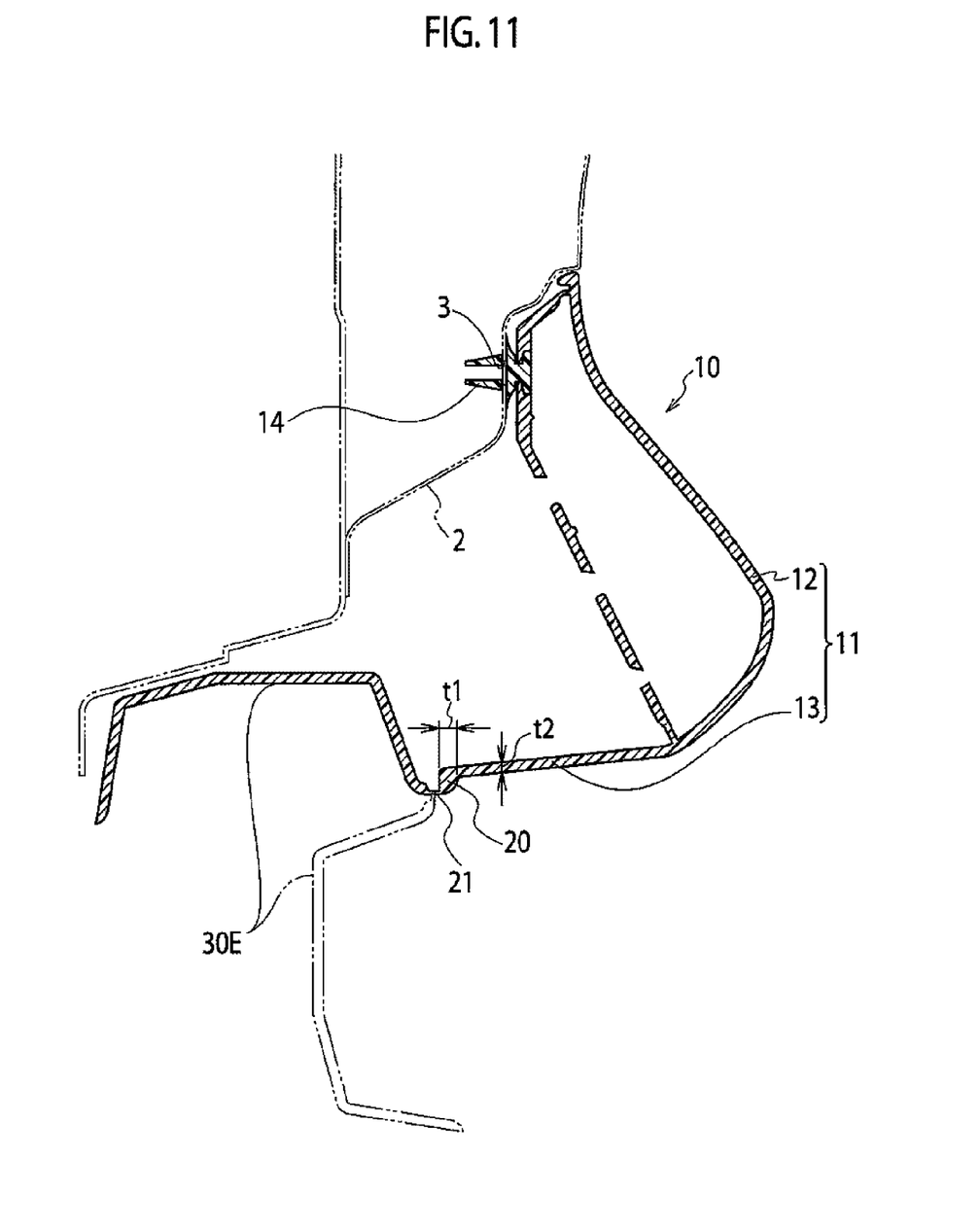
FIG. 11 is a cross-sectional view that illustrates a vehicle mounting state at a sill cover main body side according to the exemplary embodiment of the present invention.
Figure 12:
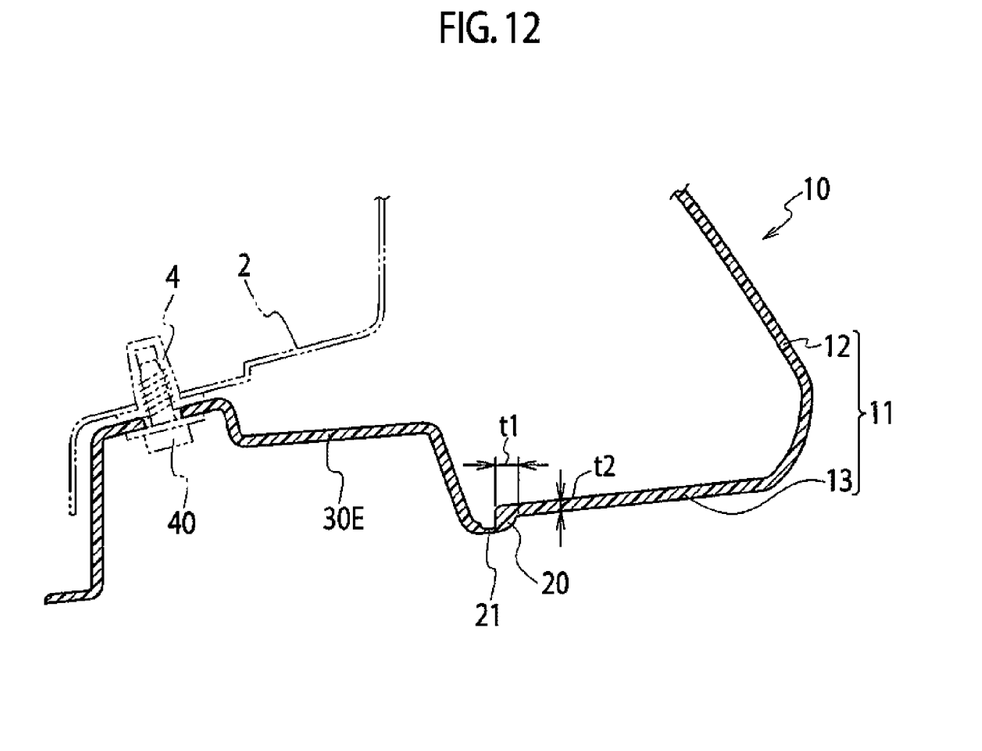
FIG. 12 is a cross-sectional view that illustrates a vehicle mounting state at an attachment side according to the exemplary embodiment of the present invention.

FIG. 1 is a schematic perspective view of a vehicle 1. FIG. 2 is a side view of a sill cover 10 where attachments 30A to 30F are in injection molding positions. FIG. 3 is a perspective view of the sill cover 10 viewed from an inner surface side thereof where the attachments 30A to 30F are in vehicle mounting positions. FIG. 4 is a perspective view of the sill cover 10 viewed from the inner surface side thereof where the attachments 30A to 30F are in the injection molding positions. FIG. 5 is a perspective view of the sill cover 10 viewed from an outer surface side thereof where the attachments 30A to 30F are in the vehicle mounting positions. FIG. 6 is a perspective view of the sill cover 10 viewed from the outer surface side thereof where the attachments 30A to 30F are in the injection molding positions. FIG. 7 is an enlarged view of a "P" area shown in FIG. 3. FIG. 8 is a cross-sectional view due to a line A-A shown in FIG. 7. FIG. 9 is a cross-sectional view due to a line B-B shown in FIG. 7. FIG. 10A is an explanatory drawing that illustrates a flow of molten synthetic resin material at a time of injection molding according to the exemplary embodiment of the present invention. FIG. 10B is an explanatory drawing that illustrates a flow of molten synthetic resin material at a time of injection molding according to a comparative example. FIG. 11 is a cross-sectional view that illustrates a vehicle mounting state at a sill cover main body side. FIG. 12 is a cross-sectional view that illustrates a vehicle mounting state at an attachment side. It is noted that several parts of an attachment will be described as at least the attachments 30B, 30C and 30D in the exemplary embodiment.

As shown in FIG. 1, the sill cover 10, which is an elongated resin molded component for a vehicle, is mounted on a bottom side of a door of the vehicle 1 to protect a vehicle body.

As shown in FIGS. 2 to 7, the sill cover 10 includes a sill cover main body 11 that is an elongated molded component main body, a step portion 20 that is provided to the sill cover main body 11, hinges 21 that are foldably provided to the step portion 20, and the attachments 30A to 30F that are connected to the step portion 20 via the hinges 21. Under a situation where the attachments 30A to 30F are in injection molding positions (positions shown in FIGS. 4 and 6), the sill cover 10 is made by injection-molding synthetic resin material such as polypropylene integrally.

The sill cover main body 11 includes a side surface portion 12 that extends in a longitudinal direction of the sill cover main body 11, and a bottom surface portion 13 that is protruded in an in-vehicle direction from a lower end of the side surface portion 12. A plurality of clip portions 14 is provided on an inner surface side of the side surface portion 12 in place.

The bottom surface portion 13 is formed in a curved surface shape so that the sill cover 10 looks like it becomes narrower in the center thereof in a vehicle mounting state, in order to meet requests reduction of air resistance and exterior design. More specifically, when the bottom surface portion 13 is viewed from a vehicle side, the center of the bottom surface portion 13 is most highly-placed and the bottom surface portion 13 is gradually and gently lowly-placed as progressing from the center to both ends thereof.

The step portion 20 is provided over the whole area in a longitudinal direction of the bottom surface portion 13. At a distal end side of the step portion 20, five cut portions 15 are intermittently formed in a longitudinal direction of the step portion 20. Six extended bottom surface portions 13A extend from the bottom surface portion 13 via the step portion 20. Under this configuration, at the distal end side of the step portion 20, the five cut portions 15 and six extended bottom surface portions 13A are alternately arranged along the longitudinal direction of the step portion 20. The step portion 20 includes hinge support ends that respectively support the hinges 21.

A height "h" of the step portion 20 is varied, according to a position in the longitudinal direction of the step portion 20 in an area where each cut portion 15 is formed, so that lowermost side surfaces of the hinge support ends are located on one plane. Since the hinges 21 are respectively supported by the hinge support ends on the lowermost side surfaces of the hinge support ends, center regions (rotation axes) of the hinges 21 are linearly arranged along a longitudinal direction of the sill cover 10 at positions lower than the bottom surface portion 13 by one step due to the step unit 20. In order to retain continuity of the step portion 20, a height "h" of the step portion 20 is varied according to a position in the longitudinal direction of the step portion 20 in an area where each extended bottom surfaces portion 13A is formed. Thereby, the extended bottom surface portions 13A are arranged along the longitudinal direction of the sill cover 10 at positions lower than the bottom surface portion 13 by one step due to the step portion 20.

A thickness "t1" of step portion 20 is set to be larger than a thickness "t2" of the sill cover main body 11 (t2<t1, see FIGS. 11 and 12).

A plurality of rib portions 16 is intermittently formed on each extended bottom surfaces portion 13A and extends from the step portion 20 in a direction perpendicular to the step portion 20. Two engagement holes 35 are formed on each of two extended bottom surfaces portions 13A which are respectively located between the attachments 30A and 30B and between the attachments 30D and 30E.

The attachments 30A to 30F are respectively connected to the hinge support ends of the step portion 20, which are located at end portions of the cut portions 15, via the hinges 21. One attachment hole 31 is formed on each of the attachments 30B to 30F. Two attachment holes 31 are formed on the attachment 30A.

Each of the attachments 30B, 30C and 30D, which are located between the attachments 30A and 30E, is set to be smaller than each of the attachments 30A and 30E in width. The attachments 30B, 30C and 30D are linked to one another via a linking portion 32. Therefore, the linking portion 32 allows the attachments 30B, 30C and 30D to shift from the injection molding positions to the vehicle mounting positions in an integrated manner.

Two engagement portions 33 are provided to each of the attachments 30A to 30E. One engagement portion 33 is provided on the attachment 30F. When the attachments 30A to 30F are in the vehicle mounting positions, each engagement portion 33 is engaged to an end edge of each corresponding extended bottom surface portion 13A. Each of two engagement portions 33 of the attachment 30A, one engagement portion 33 of the attachment 30B, one engagement portion 33 of the attachment 30D, and two engagement portions 33 of the attachment 30E includes an engagement claw 33A and an engagement hole 33B. Each of the other engagement portion 33 of the attachment 30B, two engagement portions 33 of the attachment 30C, the other engagement portion 33 of the attachment 30D and one engagement portion 33 of the attachment 30I includes only an engagement claw 33A. Two engagement portions 34 are provided to the linking portion 32. When the attachments 30A to 30F are in the vehicle mounting positions, two engagement portions 34 are respectively engaged to end edges of two extended bottom surface portions 13A located between the attachments 30B and 30C and between the attachments 30C and 30D. In the vehicle mounting positions, it is possible to assume that the linking portion 32 constitutes a part of the bottom surface portion 13 of the sill cover main body 11 (see FIGS. 3 and 7). The linking portion 32 allows distal ends of the attachments 30B, 30C and 30D to be linked to one another. A Rib portion 32a is formed on the linking portion 32 along a linking direction (a longitudinal direction of the linking portion 32). The engagement portions 34 are mounted to cut portions of the rib portion 32a (see FIG. 7).

Next, proceeding for manufacturing the sill cover 10 will be briefly described.

The sill cover 10 is made by injection-molding using a mold. The mold includes a fixed mold portion and a movable mold portion. A cavity corresponding to an external form of the sill cover 10, where a molten synthetic resin material is to be molded into the external form, is defined by combining the fixed mold portion and the movable mold portion. Gates G through which a molten synthetic resin material is to be injected into the cavity are formed at a side of the fixed mold portion. More specifically, the gates G are formed on a cavity portion corresponding to the attachment 30A where a molten synthetic resin material is to be molded into the form of the attachment 30A, a cavity portion corresponding to the attachment 30E where a molten synthetic resin material is to be molded into the form of the attachment 30E, and a cavity portion corresponding to one of the attachments 30B, 30C and 30D (the attachment 30C in this embodiment) where a molten synthetic resin material is to be molded into the from of the one of the attachments 30B, 30C and 30D (see virtual lines in FIG. 2).

Next, proceeding for mounting the sill cover 10 to the vehicle body will be described.

In the sill cover 10 including the attachments 30A to 30F formed by injection-molding in the injection molding positions shown in FIGS. 4 and 6, each of the attachments 30A to 30F is folded with respect to the sill cover main body 11 according to folding of each corresponding hinge 21 to shift from the injection molding position shown in FIGS. 4 and 6 into the vehicle mounting position shown in FIGS. 3 and 5. It is noted that the attachments 30B, 30C and 30D shift in an integrated manner because these attachments are linked to one another by the linking portion 32.

Then, each engagement portion 33 and each engagement portion 34 are engaged to an end edge of each corresponding extended bottom surface portion 13A. Thereby, the attachments 30A to 30F are held in the vehicle mounting positions shown in FIGS. 3 and 5 against elastic restoring force of the hinges 21. The attachments 30A to 30F held in the vehicle mounting positions are fixed to the extended bottom surface portions 13A by screwing screws 36 into the engagement holes 33B and 35.

The sill cover 10 in which the attachments 30A to 30F are in the vehicle mounting positions shown in FIGS. 3 and 5 is located in a mounting position at the bottom side of a door of a vehicle body 2. Then, as shown in FIG. 11, each clip portion 14 provided on an inner surface of the sill cover main body 11 is mounted into each clip engagement hole 3 of the vehicle body 2. Also, as shown in FIG. 12, tapping screws 40 are inserted into the attachment holes 31 of the attachments 30A to 30F to be mounted into grommets 4 of the vehicle body 2. Thereby, the sill cover 10 is mounted to the vehicle body 2.

As described above, the sill cover 10 includes the elongated sill cover main body 11, the plurality of hinges 21 that is foldably provided along the longitudinal direction of the sill cover main body 11, the plurality of attachments 30A to 30F that is connected to the plurality of hinges 21 and shifts to the vehicle mounting position according to folding of the plurality of hinges 21, and the linking portion 32 that links three attachments 30B, 30C and 30D to one another.

Thus, in the present case of providing the attachments 30B, 30C and 30D linked to one another by the linking portion 32, these attachments can be easily folded because a total width dimension of hinges 21 in the present case is shorter than one of a single hinge in a conventional case of providing a single attachment instead of the attachments 30B, 30C and 30D linked to one another by the linking portion 32, which reduces bending rigidity of the hinges 21. Also, folding man-hour does not increase and folded positions do not deviate because the attachments 30B, 30C and 30D are set to be folded in an integrated manner.

In the processing for manufacturing the sill cover 10, one gate G is formed on the cavity portion corresponding to one of the attachments 30B, 30C and 30D (the attachment 30C in this embodiment), and a molten synthetic resin material is injected through the one gate G and cavity portions corresponding to the attachments 30B, 30C and 30D are filled with the molten synthetic resin material. This prevents a shortage of resin from occurring because the molten synthetic resin material injected through the one gate G flows from the cavity portion corresponding to the attachment 30C into the cavity portions corresponding to the attachments 30B and 30D through a cavity portion corresponding to the linking portion 32 where a molten synthetic resin material is to be molded into the form of the linking portion 32 in addition to a cavity portion corresponding to the sill cover main body 11 where a molten synthetic resin material is to be molded into the form of the sill cover main body 11 (see arrows in FIG. 10A).

More specifically, as shown in FIG. 10B, in a conventional case where the attachments 30B, 30C and 30D are not linked to one another by the linking portion 32, a molten synthetic resin material injected through the one gate G flows from the cavity portion corresponding to the attachment 30C into only the cavity portion corresponding to the sill cover main body 11 through a cavity portion corresponding to the hinge portion 21, and then a part of the molten synthetic resin material flows into the cavity portions corresponding to the attachments 30B and 30D through cavity portions corresponding to the hinges 21. Therefore, there is a possibility that a moderate amount of molten synthetic resin material is not robustly flows into the cavity portions corresponding to the attachments 30B and 30D, which causes a shortage of resin to often occur. In contrast, as shown in FIG. 10A, in the present case where the attachments 30B, 30C and 30D are linked to one another by the linking unit 32, a resin injected through the one gate G flows from the cavity portion corresponding to the attachment 30C into the cavity portion corresponding to the sill cover main body 11 through the cavity portion corresponding to the hinge 21 and into the cavity portions corresponding to the attachments 30B and 30D through the cavity portion corresponding to the linking portion 32. Therefore, a moderate amount of moten synthetic resin material is robustly flows into the cavity portions corresponding to the attachments 30B and 30D, which prevents a shortage of resin from occurring. It is noted that flow routes of molten synthetic resin material are indicated by arrows and flow regions of molten synthetic resin material are indicated by hatching in FIGS. 10A and 10B, which clarifies the differences between the present case where there is the liking portion 32 and the conventional case where there is not the liking portion 32.

In the vehicle mounting positions, it is possible to assume that the linking portion 32 constitutes a part of two extended bottom surface portions 13A of the sill cover main body 11. This configuration allows the linking portion 32 to protect the vehicle body together with the sill cover main body 11 after the attachments 30B, 30C and 30D are folded, which increases rigidity of the sill cover main body 11.

The linking portion 32 is provided with two engagement portions 34 to be respectively engaged to two corresponding extended bottom surface portions 13A in the vehicle mounting positions. This configuration allows the attachments 30B, 30C and 30D to be held in the vehicle mounting positions against elastic restoring force of the hinges 21, which improves a vehicle mounting work.

The linking portion 32 links distal ends of the attachments 30B, 30C and 30D. This configuration allows a flow of molten synthetic resin material injected into the cavity portion corresponding to one of the attachments 30B, 30C and 30D (the attachment 30C in this embodiment) to be dispersed into a first route where a molten synthetic resin material flows through the cavity portion corresponding to the hinge 21 and a second route where a molten synthetic resin material flows through the cavity portion corresponding to the linking portion 32. This increases efficiency of the flow of molten synthetic resin material, which prevents a shortage of resin from occurring.

The linking portion 32 is provided with the rib portion 32a along a linking direction thereof. This configuration increases the strength of linking portion 32, which improves the integrity of the attachments 30B, 30C and 30D linked to one another by the linking portion 32 and improves a folding work. Further, since the cavity portion corresponding to the linking portion 32 is relatively thick at positions where the rib portion 32a is to be formed, the efficiency of the flow of molten synthetic resin material increases, which prevents a shortage of resin from occurring.

Each of the attachments 30A to 30E is provided with one or more engagement portions 33 to be engaged to the corresponding extended bottom surface portion 13A in the vehicle mounting positions. This configuration allows the attachments 30B, 30C and 30D to be held in the vehicle mounting positions against elastic restoring force of the hinges 21, which improves a vehicle mounting work.

Some of the engagement portions 33 are engaged to corresponding extended bottom surface portions 13A by screwing the screws 36 into the engagement holes 33B of the some of engagement portions 33 and the engagement holes 35 of the corresponding extended bottom surface portions 13A. This configuration prevents the sill cover 10 from unfastening after the sill cover 10 is mounted to the vehicle body 2.

In this embodiment, although three attachments 30B, 30C and 30D are linked to one another by the linking portion 32, the linking portion 32 may link two attachments or four or more attachments to one another.

As described above, since a moderate amount of molten synthetic resin material robustly flows into the cavity portions corresponding to the attachments 30B, 30C and 30D linked to one another by the linking portion 32, it is possible to assume that a plurality of gates is formed on the cavity portions corresponding to the attachments 30B, 30C and 30D linked to one another by the linking portion 32. This reduces load (deflection and divergence) for a mold due to a filling distance from each gate G and a filling pressure per one point, which prevents burr due to pressure concentration from occurring. Further, since a trace of each gate remains on the attachment 30C which is rarely unnoticed in the vehicle mounting state, quality of the sill cover 10 increases.

Each extended bottom surface portion 13A is provided with the plurality of rib portions 16 which extends from the thick step portion 20 for supporting the hinges 21. This configuration allows a molten synthetic resin material to efficiently flow into a cavity portion corresponding to each extended bottom surface portion 13A through cavity portions corresponding to the step portion 20 and the plurality of rib portions 16 in the injection-molding. This prevents a shortage of resin from often occurring at an extended bottom surface portion 13A located away from a gate G through which a molten synthetic resin material is to be injected.

In this exemplary embodiment, although the sill cover 10 is cited as an example of a resin molded component for a vehicle, even if another member is cited as another example of the resin molded component, the present invention may be applied to the another example.

In this exemplary embodiment, although the sill cover main body 11 is mounted to the vehicle body 2 using the clip portions 14, the present invention is not limited to it. The sill cover main body 11 may be mounted to the vehicle body 2 using another adequate member.

What is claimed is:

1. A resin molded component for a vehicle comprising:
an elongated molded component main body;
a plurality of hinges that is foldably provided along a longitudinal direction of the molded component main body;
a plurality of attachments that is connected to the plurality of hinges and shifts to a vehicle mounting position according to folding of the plurality of hinges; and
a linking portion that links at least two attachments to each other,
wherein the linking portion and at least the two attachments are formed in an integrated manner to shift as a unit according to folding of the plurality of hinges, and
the linking portion constitutes a part of the molded component main body in the vehicle mounting position.

2. The resin molded component for a vehicle according to claim 1, wherein the linking portion is provided with an engagement portion to be engaged to the molded component main body in the vehicle mounting position.

3. The resin molded component for a vehicle according to claim 1, wherein the linking portion links distal ends of at least the two attachments to each other.

4. The resin molded component for a vehicle according to claim 1, wherein the linking portion is provided with a rib portion along a linking direction thereof.

5. The resin molded component for a vehicle according to claim 1, wherein the plurality of attachments is provided with engagement portions to be engaged to the molded component main body in the vehicle mounting position.

6. The resin molded component for a vehicle according to claim 1, wherein a gate for injection molding is formed a cavity portion corresponding to any one of at least the two of attachments.

* * * * *